(12) United States Patent
Chen et al.

(10) Patent No.: US 9,389,659 B2
(45) Date of Patent: Jul. 12, 2016

(54) POWER SUPPLY SYSTEM

(71) Applicant: International Business Machines Corporation, Armonk, NY (US)

(72) Inventors: Jung-Tai Chen, Taipei (TW); Wei-Tien Chen, Taipei (TW); George Cheng, New Taipei (TW); Chih-Chiang Chiu, Taichung County (TW); Chin-Yu Huang, Taipei (TW); JunHom Lin, Taipei (TW); W. J. Tseng, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 13/966,334

(22) Filed: Aug. 14, 2013

(65) Prior Publication Data

US 2014/0095900 A1     Apr. 3, 2014

(30) Foreign Application Priority Data

Sep. 28, 2012   (TW) .............................. 101136002 A

(51) Int. Cl.
*G06F 1/30*   (2006.01)
*G06F 1/26*   (2006.01)

(52) U.S. Cl.
CPC ... *G06F 1/26* (2013.01); *G06F 1/30* (2013.01)

(58) Field of Classification Search
None
See application file for complete search history.

(56) References Cited

U.S. PATENT DOCUMENTS

| | | | |
|---|---|---|---|
| 2002/0067630 A1* | 6/2002 | Tokunaga et al. ............. | 363/125 |
| 2005/0024016 A1* | 2/2005 | Breen ..................... | H02J 7/022 |
| | | | 320/128 |
| 2010/0187908 A1* | 7/2010 | Okano et al. ................... | 307/64 |
| 2011/0127833 A1 | 6/2011 | Wu et al. | |
| 2011/0283119 A1* | 11/2011 | Szu et al. ...................... | 713/300 |
| 2012/0026764 A1 | 2/2012 | Giuntini et al. | |
| 2013/0154545 A1* | 6/2013 | Wang ............................ | 320/107 |
| 2013/0184891 A1* | 7/2013 | Etaati ............................ | 700/295 |

FOREIGN PATENT DOCUMENTS

| | | |
|---|---|---|
| TW | 200928710 A | 7/2009 |
| TW | 200925843 B | 4/2012 |

OTHER PUBLICATIONS

Hewlett Packard Develpment, "Methods and apparatus for managing power on a computer in the event of a power interruption" Espacenet, http://worldwide.espacenet.com/publicationDetails, Jul. 1, 2009, TW200928710(A) English Abstract, 2 pages.

Phoenixtec Power Co., Ltd., "Converting device with multiple power inputs and UPS system having the same", Espacenet, http://worldwide.espacenet.com/publicationDetails, Apr. 11, 2012, Bibliographic data: TWI361974(B), TW200925843(A) English Abstract, 1 page.

* cited by examiner

*Primary Examiner* — Paul Yanchus, III
(74) *Attorney, Agent, or Firm* — Jeffrey L. Streets

(57) ABSTRACT

A power supply system for an information handling system is provided. The information processing system is electrically coupled to an AC power source and includes at least one computer unit. The power supply system includes: at least one AC power supply unit electrically coupled to the at least one computer unit and the AC power source; at least one DC power supply unit electrically coupled to the at least one computer unit; and a backup power unit electrically coupled to the at least one DC power supply unit. In response to the at least one AC power supply unit not supplying power, the at least one DC power supply unit supplies power to the at least one computer unit. A data center having the power supply system is further provided.

16 Claims, 3 Drawing Sheets

_US 9,389,659 B2_

POWER SUPPLY SYSTEM

CROSS-REFERENCE TO RELATED APPLICATIONS

This application is based on and claims the benefit of priority from Taiwan Patent Application 101136002, filed on Sep. 28, 2012, the entire text of which is incorporated by reference herein.

BACKGROUND OF THE INVENTION

1. Field of the Invention

The present invention relates to data processing systems, and more particularly relates to power supplies for use with information processing systems.

2. Background of the Related Art

Due to rapid development of cloud computing, storing a tremendous amount of data in a data center is now a mainstream trend. The data center is a large concentrated computing apparatus built at high costs, and may include hundreds or thousands of computer systems positioned in frames or racks. Typically, a power supply system not only supplies power to the data center, but also transforms a voltage of utility electricity into a voltage required for the data center.

FIG. 1 illustrates a conventional data center 100. The data center 100 provides a space for holding a data processing system 102. The data processing system 102 comprises one or more computer units 104, such as one or more servers. The one or more computer units 104 are each electrically coupled to a first AC power supply unit (or AC PSU) 116, and are each electrically coupled to a second AC power supply unit 120. A backup power unit 112 (such as an uninterruptible power supply (UPS) system or a battery) is electrically coupled to the first AC power supply unit 116 and the second AC power supply unit 120. The backup power unit 112 is electrically coupled to an AC power source 108. The AC power source 108 receives power from a utility power grid. Referring to FIG. 1, the first AC power supply unit 116 and the second AC power supply unit 120 are equal (50%:50%) substantially in terms of a load thereof; hence, the temperature of the first AC power supply unit 116 approximates to the temperature of the second AC power supply unit 120. The life cycle of every component of the power supply units is substantially identical, and thus the service life of the power supply units is similar. The AC power supply units 116, 120 convert AC voltage into a plurality of DC voltages for use by the system later. Typically, the AC power supply units 116, 120 operate in conjunction with an inverter (not shown). However, the inverter has a disadvantage, that is, it causes a decrease in the energy efficiency of the AC power supply units 116, 120. Referring to FIG. 1, to overcome the aforesaid disadvantage, a conventional power design features enhanced power capacity of the backup power unit 112. Hence, the wide application of the inverter to the AC power supply units 116, 120 leads to a boost of the power capacity of the backup power unit 112 at the detriment of elevating capital and operating costs and deteriorating energy efficiency.

Considering the need for environmental protection, the elevating power generation costs, and the increasingly great demand for electric power, it is recognized that energy efficiency is an important factor in planning and performing data center management. Accordingly, it is imperative to enhance the energy efficiency of data centers and reduce the operating costs of a power supply system.

BRIEF SUMMARY

One embodiment of the present invention provides a power supply system for providing power to an information processing system, the information processing system being electrically coupled to an AC power source and comprising at least one computer unit. The power supply system comprises at least one AC power supply unit electrically coupled to the at least one computer unit and the AC power, respectively; at least one DC power supply unit electrically coupled to the at least one computer unit; and a backup power unit electrically coupled to the at least one DC power supply unit; wherein, in response to the at least one AC power supply unit not supplying power, the at least one DC power supply unit automatically supplies power to the at least one computer unit.

Another embodiment of the present invention provides a data center, comprising an information processing system electrically coupled to an AC power source and comprising at least one computer unit; and a power supply system. The power supply system comprises: at least one AC power supply unit electrically coupled to the at least one computer unit and the AC power, respectively; at least one DC power supply unit electrically coupled to the at least one computer unit; and a backup power unit electrically coupled to the at least one DC power supply unit; wherein, in response to the at least one AC power supply unit not supplying power, the at least one DC power supply unit automatically supplies power to the at least one computer unit.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
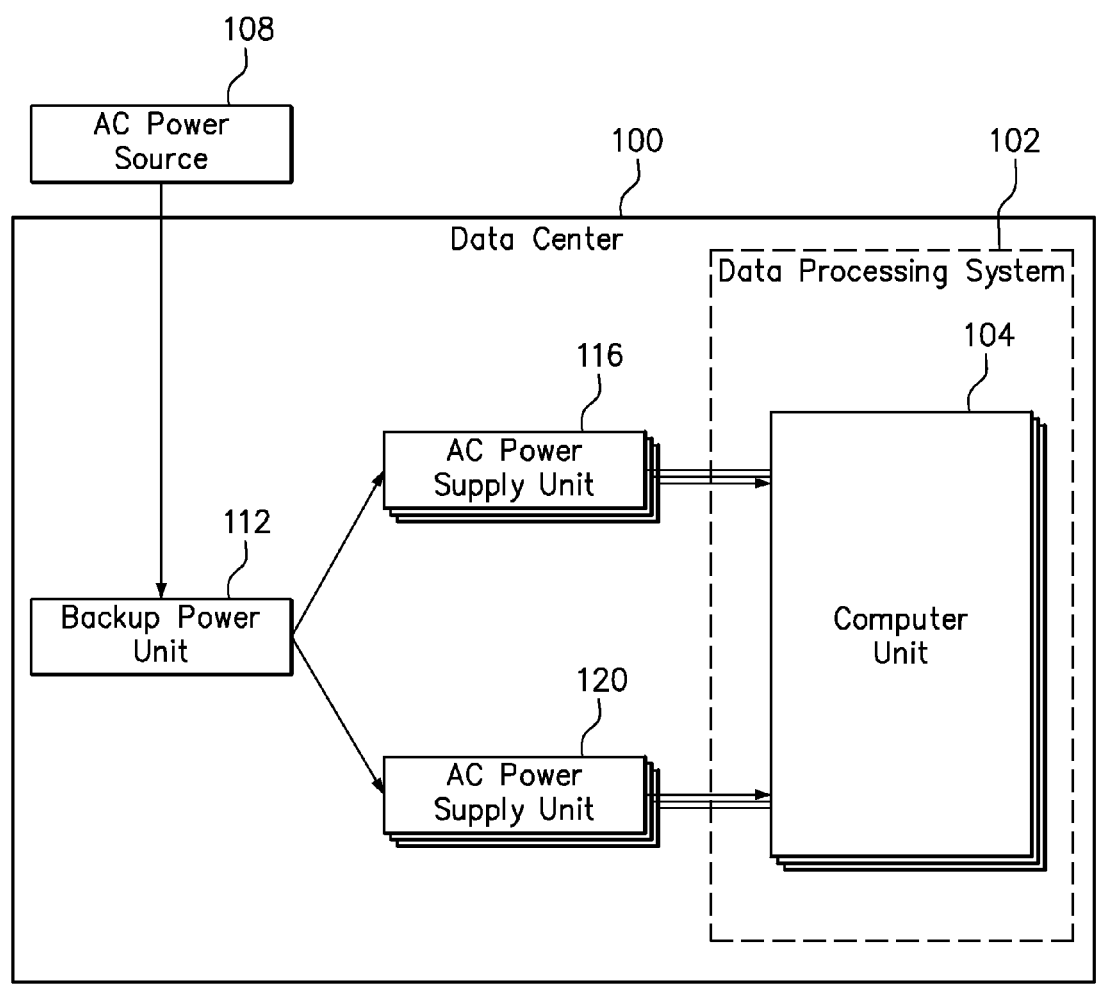
FIG. 1 is a diagram of a power supply system of a conventional data center.

In an aspect, the present invention provides a power supply system of an information processing system and a data center comprising the information processing system to provide real-time and efficient backup load output, cut its implementation costs, and enhance its energy efficiency.

In the power supply system according to one embodiment of the present invention, the information processing system is electrically coupled to an AC power source and comprises at least one computer unit. The power supply system comprises: at least one AC power supply unit electrically coupled to the at least one computer unit and the AC power source; at least one DC power supply unit electrically coupled to the at least one computer unit; and a backup power unit electrically coupled to the at least one DC power supply unit, wherein, in response to the at least one AC power supply unit not supplying power, the at least one DC power supply unit supplies power to the at least one computer unit.

According to various embodiments of the present invention, in response to the at least one AC power supply unit supplying power well, the at least one DC power supply unit operates in a standby mode, such that components of the at least one DC power supply unit operate in a standby mode and with a wattage output of zero substantially.

In another embodiment of the present invention, if power interruption does not occur to one of an input end and an output end of the AC power supply unit, a load output of the DC power supply unit will be zero, wherein, if power interruption occurs to one of the input end and the output end of the AC power supply unit, the DC power supply unit will instantly provide a load output.

In another embodiment of the present invention, the at least one computer unit comprises a system administration module, the at least one AC power supply unit comprises an AC power supply unit microcontroller, and the DC power supply unit comprises a DC power supply unit microcontroller, wherein the system administration module is electrically coupled to the AC power supply unit microcontroller and the DC power supply unit microcontroller via a communication bus to thereby manage and control one of the at least one AC power supply unit and the DC power supply unit to supply power to the at least one computer unit.

In yet another embodiment of the present invention, the at least one AC power supply unit comprises a first switching module, wherein the at least one DC power supply unit comprises a second switching module and a DC power supply unit output control module, wherein an output of the first switching module is electrically coupled to an input of the second switching module, wherein an output of the second switching module is electrically coupled to an input of the DC power supply unit output control module, wherein, in response to the at least one AC power supply unit not supplying power, the first switching module sends an enabling signal for enabling the second switching module and thereby enabling the DC power supply unit output control module to control the at least one DC power supply unit to supply power to the at least one computer unit.

In a further embodiment of the present invention, the first switching module comprises a first OR gate, and the at least one AC power supply unit further comprises an AC power supply unit input power interruption detection module and an AC power supply unit output power interruption detection module, wherein a failure pin of the AC power supply unit input power interruption detection module and a failure pin of the AC power supply unit output power interruption detection module are electrically coupled to the two inputs of the first OR gate.

In a still further embodiment of the present invention, the second switching module comprises a second OR gate, wherein an output of the first OR gate and an output of the DC power supply unit microcontroller are electrically coupled to the two inputs of the second OR gate, wherein an output of the second OR gate is electrically coupled to an input of the DC power supply unit output control module.

In an additional embodiment of the present invention, the AC power supply unit input power interruption detection module and the AC power supply unit output power interruption detection module detect whether power interruption occurs to an input end and an output end of the AC power supply unit, respectively, wherein, if power interruption occurs to one of the input end and the output end of the AC power supply unit, the first OR gate will output an enabling signal for enabling the second OR gate, and an output of the second OR gate will enable the DC power supply unit output control module to control the DC power supply unit to supply power to the at least one computer unit.

In another embodiment of the present invention, a data center comprises an information processing system and the power supply system for supplying power to the information processing system.

Reference throughout this specification to features, advantages, or similar language does not imply that all of the features and advantages that may be realized with the present invention should be, or are, in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but does not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment", and similar language throughout this specification may, but do not necessarily, all refer to the same embodiment.

Figure 2:
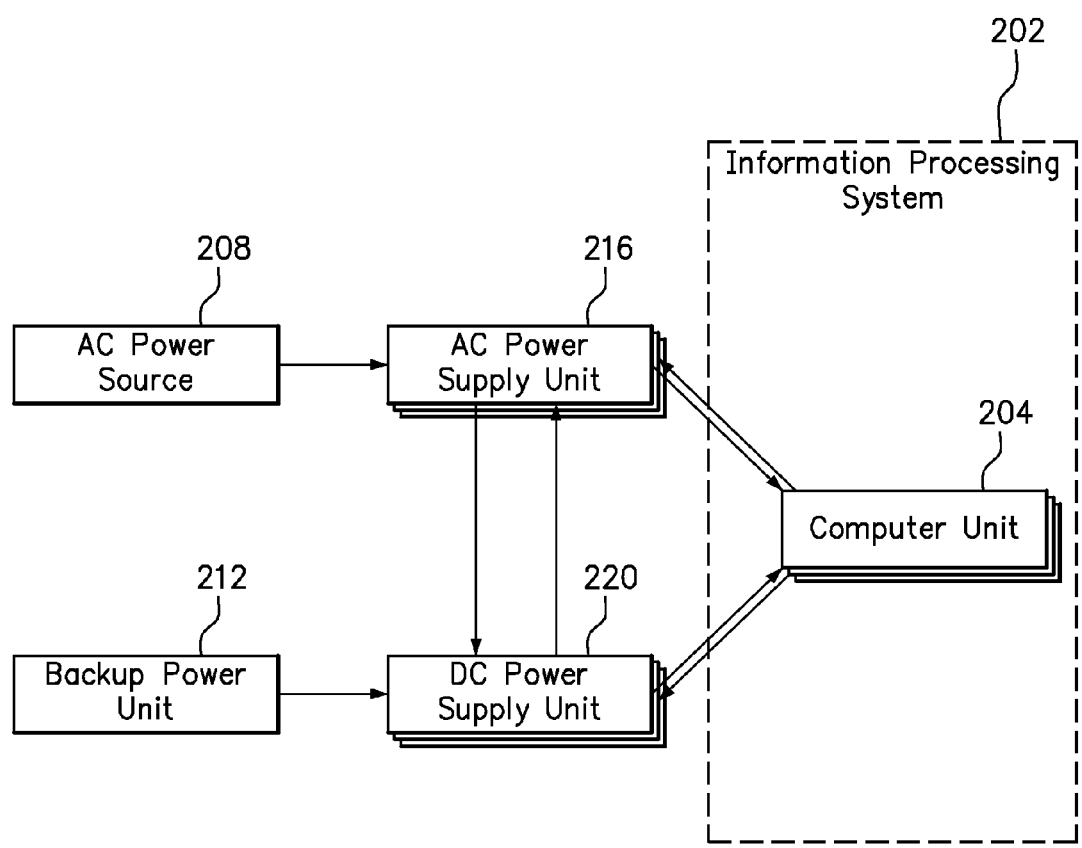
FIG. 2 is a diagram of a power supply system of a data center according to an embodiment of the present invention.

Referring to FIG. 2, there is shown a block diagram of a power supply system of an information processing system 202 according to a preferred embodiment of the present invention. The information processing system 202 comprises one or more computer units 204. The power supply system of the information processing system 202 comprises: at least one AC power supply unit 216 electrically coupled to the at least one computer unit 204 and an AC power source 208, respectively; at least one DC power supply unit (or DC PSU) 220 electrically coupled to the at least one computer unit 204, respectively; and a backup power unit 212 electrically coupled to the at least one DC power supply unit 220. In one embodiment of the present invention, in response to the at least one AC power supply unit 216 supplying power well, the at least one AC power supply unit 216 supplies power to the at least one computer unit 204. In response to the at least one AC power supply unit 216 not supplying power, the at least one DC power supply unit 220 supplies power to the at least one computer unit 204. When the at least one AC power supply unit 216 supplies power to the at least one computer unit 204, the at least one DC power supply unit is in a standby mode and its wattage output is substantially zero. Related details are described below.

In a further embodiment of the present invention, the at least one computer unit 204 may be, for example, a server unit, a data processor unit, an exchanger unit, a router unit, a network apparatus unit, or any other computer component/ unit, but the present invention is not limited thereto. For instance, details of the basic structure and components of the at least one computer unit may be consistent with typical personal computers or servers, such as IBM's System X, Blade Center, or eServer server. Details not related to the present invention are omitted from the description below.

In a still further embodiment of the present invention, the at least one computer unit 204 are electrically coupled to the at least one AC power supply unit 216, respectively, whereas the at least one computer unit 204 is electrically coupled to the at least one DC power supply unit 220, respectively. The at least one AC power supply unit 216 is electrically coupled to the AC power source 208. The AC power source 208 may receive power from a utility power grid, for example. The at least one DC power supply unit 220 is electrically coupled to the backup power unit 212. The backup power unit 212 includes, but is not limited to, an uninterruptible power supply (UPS) system or a battery. Likewise, the at least one AC power supply unit 216 may transform AC voltage into a plurality of DC voltages. The at least one DC power supply unit 220 may also transform DC voltage into a plurality of DC voltages for use by the system later.

The at least one DC power supply unit 220 has a standby mode. If the at least one AC power supply unit 216 supplies power well and the at least one DC power supply unit 220 keeps operating in the standby mode, its wattage output will be substantially zero. Hence, the power supply system shown in FIG. 2 can be maintained at a very low net power consumption level, and its energy efficiency is relatively desirable. If the at least one AC power supply unit 216 is unable to supply power, the at least one DC power supply unit 220 can supply power instantly and provide backup power. Details and structures of the at least one AC power supply unit 216 and the at least one DC power supply unit 220 are described and explained below.

Figure 3:
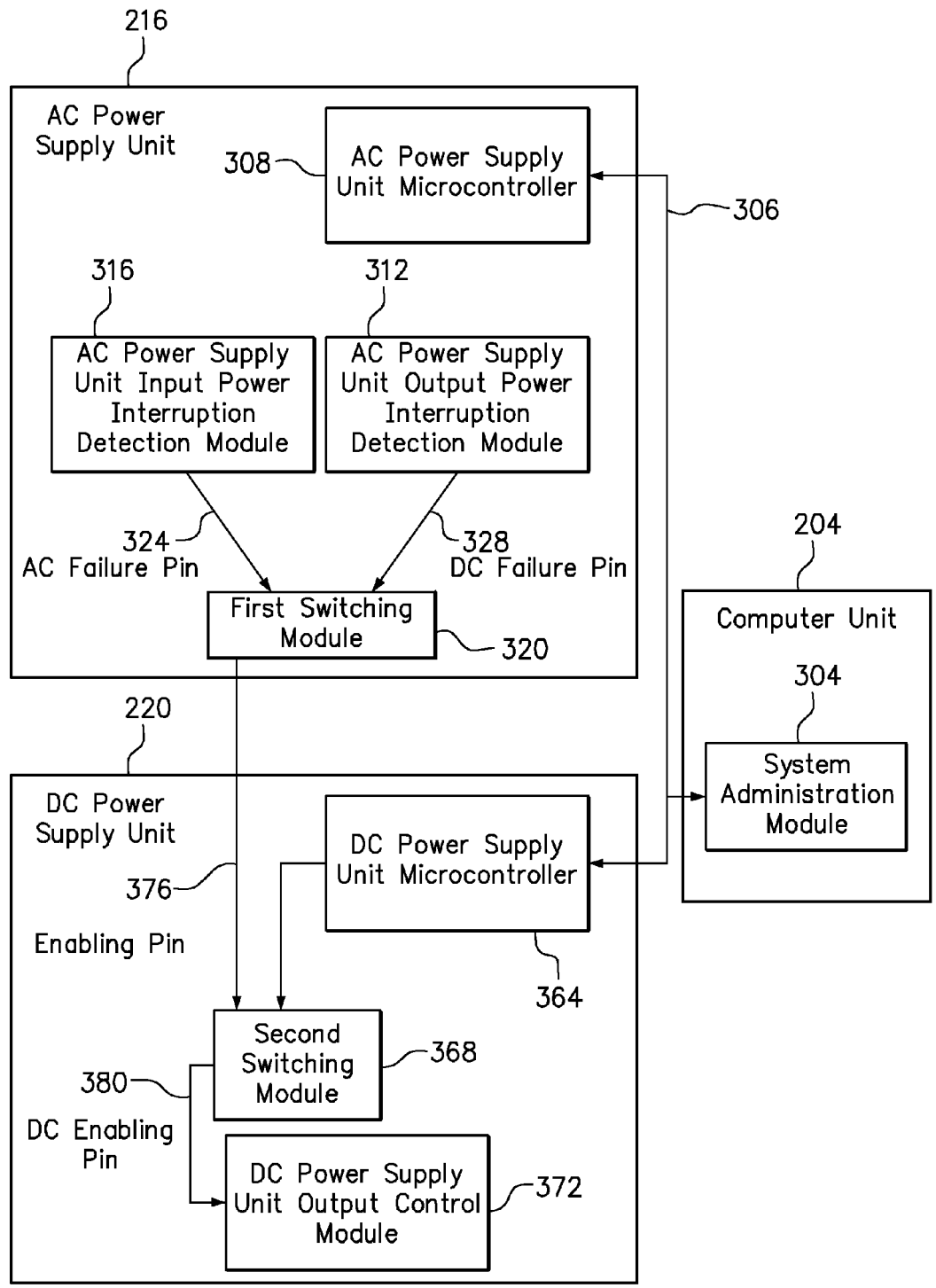
FIG. 3 is a diagram of power supply system of a data center according to another embodiment of the present invention.

Referring to FIG. 3, there is shown a structural schematic view of the at least one computer unit 204, the at least one AC power supply unit 216, and the at least one DC power supply unit 220 of the embodiment of FIG. 2 in accordance with a further embodiment of the present invention.

The at least one computer unit 204 comprises a system administration module 304. The at least one AC power supply unit 216 comprises an AC power supply unit microcontroller (also known as a microprocessor control unit) 308. The at least one DC power supply unit 220 comprises a DC power supply unit microcontroller 364. The system administration module 304 is electrically coupled to the AC power supply unit microcontroller 308 and the DC power supply unit microcontroller 364 via a communication bus 306.

The system administration module 304 is typically a microcontroller module for monitoring system operation. The system administration module 304 comprises a microcontroller and a memory (not shown). In the preferred embodiment of the present invention, the system administration module 304 is an integrated management module (IMM), an embedded controller (EC), or a management engine (ME) on a motherboard of the computer unit 204. Alternatively, the system administration module 304 comes in the form of a computer program for performing a specific function or comes in the form of a standalone administration module, but the present invention is not limited thereto. One example of a system administration module 304 is a Renesas H8S/2117 microprocessor.

The firmware of the integration management module (IMM) may comply with Intelligent Platform Management Interface (IPMI) standards for monitoring a system. In fact, the IMM may provide a system management function through IPMI 2.0 compliance and Serial over LAN (SOL), that serves as a universal management interface that supports inter-product combinations, provides server monitoring, alert, and remote control, and effectuates complete set-top system management support. The IPMI standards are well-known among persons skilled in the art and thus are not reiterated herein.

Referring to FIG. 3, with communication between the system administration module 304 (such as IMM), the AC power supply unit microcontroller 308, and the DC power supply unit microcontroller 364, it is feasible that the main power supply to the system administration module 304 of the computer unit 204 is set to the AC power supply unit 216, whereas the backup power supply is set to the DC power supply unit 220. Hence, the AC power supply unit 216 supplies power when it is capable of doing so quite well, whereas the DC power supply unit 220 starts to supply power as soon as the AC power supply unit 216 stops supplying power.

In an embodiment of the present invention, in the situation where the AC power supply unit 216 is supplying power well, the system administration module 304 may write a command via the communication bus 306 to set the AC power supply unit microcontroller 308 to state "1" and the DC power supply unit microcontroller 364 to state "0" (and thereby indicate that the AC power supply unit 216 is supplying power). In the situation where the AC power supply unit 216 is supplying power in a malfunctioning manner, the system administration module 304 sets, via the communication bus 306, the AC power supply unit microcontroller 308 to state "0" and the DC power supply unit microcontroller 364 to state "1" (and thereby indicates that the DC power supply unit 220 is supplying power). After the firmware has configured the main power supply and the backup power supply, the hardware of the power supply system can perform subsequent operations.

In addition to the AC power supply unit microcontroller 308, the AC power supply unit 216 further comprises an AC power supply unit input power interruption detection module 316, an AC power supply unit output power interruption detection module 312, and a first switching module 320 (including but not limited to the first OR gate). Optionally, the AC power supply unit input power interruption detection module 316 may be a power factor correction (PFC) controller, but the present invention is not limited thereto.

Take the power factor correction controller as an example, assuming that the AC power supply unit 216 has an input power frequency of 60 Hz, if the power factor correction controller detects a lack of power supply for at least ¼ AC cycle, it will determine that power interruption occurs to the input of the AC power supply unit 216; hence, the power factor correction controller will detect an AC failure signal, and the AC failure signal will be sent from an AC failure pin 324 of the power factor correction controller. In general, the power factor correction controller corrects a phase delay between a voltage and a current. The phase delays result from the effects of induction/capacitance. The power factor correction controller attempts to repair and match the phase between the voltage and the current. Hence, once AC power interruption occurs, the power factor correction controller will detect the interruption of the sinusoidal wave of the voltage and the current. One example of an AC power supply unit input power interruption detection module 316 is a Texas Instruments UCD3020 digital power controller.

In another embodiment of the present invention, the AC power supply unit output power interruption detection module 312 is a pulse width modulation (PWM) controller, but the present invention is not limited thereto.

The PWM controller typically has a voltage sense (Vsense) pin and a current sense (Isense) pin. Once the output voltage of the AC power supply unit 216 decreases to below a threshold, the PWM controller will generate a failure signal which will then be sent from a DC failure pin 328 of the PWM controller. Take the PWM controller as an example, assuming that DC output decreases to less than 10%, it is feasible to determine that power interruption has occurred to the output of the AC power supply unit 216. One example of an AC power supply unit output power interruption detection module 312 is a Microchip DSPIC 30F digital signal controller.

In short, the AC power supply unit input power interruption detection module 316 detects whether power interruption occurs to an input end of the AC power supply unit 216 and sends a power interruption detection signal to a first input of the first OR gate 320 via the AC failure pin 324. The AC power supply unit output power interruption detection module 312 detects whether power interruption occurs to an output end of the AC power supply unit 216 and sends a power interruption detection signal to a second input of the first OR gate 320 via the DC failure pin 328.

In addition to the DC power supply unit microcontroller 364, the DC power supply unit 220 further comprises a second switching module 368 (including but not limited to a second OR gate) and a DC power supply unit output control module 372. The DC power supply unit output control module 372 may be a PWM controller, but the present invention is not limited thereto. The PWM controller ensures that the output of the DC power supply unit 220 will be a specific DC output or zero output by, for example, changing a duty cycle. For instance, the PWM controller sets the duty cycle to 0% to ensure that its output will be zero. One example of a DC power supply unit output control module 372 is a Microchip DSPIC 30F digital signal controller.

Referring to FIG. 3, in the situation where the AC power supply unit 216 is supplying power well, the output of the AC power supply unit microcontroller 308 is set to "1" and the output of the DC power supply unit microcontroller 364 is set to "0". However, once it is detected that power interruption occurs to an input end or an output end of the AC power supply unit 216, an output signal "1" of the first OR gate 320 will become one of the input signals to the second OR gate 368, because of an enabling pin 376 for routing and connecting the AC power supply unit 216 and the DC power supply unit 220. Since the output of the DC power supply unit microcontroller 364 is "0", the output signal of the second OR gate 368 is "1". Hence, the output signal of the second OR gate 368 will be "1", provided that power interruption occurs to the input end or the output end of the AC power supply unit 216.

With an enabling pin 380 of the DC power supply unit 220, the output signal "1" of the second OR gate 368 enables the DC power supply unit output control module 372, such that the DC power supply unit output control module 372 controls the DC power supply unit 216 to supply DC power to the computer unit 204 (see FIG. 2) to thereby allow the DC power supply unit 216 to provide backup power.

Furthermore, in the situation where power interruption does not occur to the input voltage or the output voltage of the AC power supply unit 216, the output signal of the first OR gate 320 will be "0". Since the output signal of the DC power supply unit microcontroller 364 is "0", the output signal of the second OR gate 368 will be "0"; hence, the output from the DC enabling pin 380 cannot change the state of the DC power supply unit output control module 372. Therefore, the selection as to whether the DC power supply unit 220 is going to supply power or not going to supply power is controlled by detection of power interruption occurring to any one of the input and the output of the AC power supply unit 216 or the enabling/disabling of the enabling pin 376 in response to normal power supply from the input and output of the AC power supply unit 216.

Given the aforesaid arrangement and the enabling/disabling of the DC enabling pin 380, the DC power supply unit output control module 372 is capable of controlling the selection of presence versus absence of a load output. If the AC power supply unit 216 is supplying power well, the load output of the DC power supply unit 220 will be zero, though every component of the DC power supply unit 220 is active. Hence, in response to a malfunction of the AC power supply unit 216, the DC power supply unit 220 can instantly provide a backup load output of a power supply system.

Hence, in the situation where the AC power supply unit 216 is supplying power well, the DC power supply unit 220 is operating in the standby mode and its load output is zero. By contrast, in the situation where the AC power supply unit 216 is supplying power in a malfunctioning manner, the DC power supply unit 220 can instantly provide an output to thereby not only provide an instant and effective backup load output, but also enhance its energy efficiency greatly. Furthermore, the operating costs of the AC power supply unit 216 are reduced greatly as a result of reduction in use thereof and application of backup power with low power capacity.

Although the embodiment illustrated with FIG. 2 and FIG. 3 is exemplified by a power supply system of the information processing system 202, persons skilled in the art will understand that the power supply system may be utilized in more scenarios and environments easily, including but not limited to a single information processing system and therefore a plurality of information processing systems and data centers, and the present invention is not limited thereto. The data center may come in the form of a building or a space for holding a large number of information components, and its arrangement is well-known among persons skilled in the art and thus is not reiterated for the sake of brevity.

The foregoing embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A power supply system for providing power to an information processing system, the information processing system being electrically coupled to an AC power source and comprising at least one computer unit, the power supply system comprising:

at least one AC power supply unit electrically coupled to the at least one computer unit and the AC power, respectively;

at least one DC power supply unit electrically coupled to the at least one computer unit; and a backup power unit electrically coupled to the at least one DC power supply unit, wherein, in response to the at least one AC power supply unit not supplying power, the at least one DC power supply unit automatically supplies power to the at least one computer unit; and wherein the at least one computer unit comprises a system administration module, the at least one AC power supply unit comprises an AC power supply unit microcontroller, and the DC power supply unit comprises a DC power supply unit microcontroller, wherein the system administration module is electrically coupled to the AC power supply unit microcontroller and the DC power supply unit microcontroller via a communication bus to thereby control one of the at least one AC power supply unit and the DC power supply unit to supply power to the at least one computer unit; and wherein the at least one AC power supply unit comprises a first switching module, wherein the at least one DC power supply unit comprises a second switching module and a DC power supply unit output control module, wherein an output of the first switching module is electrically coupled to an input of the second switching module, wherein an output of the second switching module is electrically coupled to an input of the DC power supply unit output control module, wherein, in response to the at least one AC power supply unit not supplying power, the first switching module sends an enabling signal for enabling the second switching module and thereby enabling the DC power supply unit output control module to control the at least one DC power supply unit to supply power to the at least one computer unit.

2. The power supply system of claim 1, wherein, in response to the at least one AC power supply unit supplying power well, the at least one DC power supply unit operates in a standby mode, such that components of the at least one DC power supply unit operate in a standby mode and with a wattage output of about zero.

3. The power supply system of claim 1, wherein, if power interruption does not occur to one of an input end and an output end of the AC power supply unit, a load output of the DC power supply unit will be about zero, wherein, if power interruption occurs to one of the input end and the output end of the AC power supply unit, the DC power supply unit will instantly provide a load output.

4. The power supply system of claim 1, wherein the backup power unit comprises an uninterruptible power supply (UPS) system or a battery.

5. The power supply system of claim 1, wherein the first switching module comprises a first OR gate, and the at least one AC power supply unit further comprises an AC power supply unit input power interruption detection module and an AC power supply unit output power interruption detection module, wherein a failure pin of the AC power supply unit input power interruption detection module is electrically coupled to a first input of the first OR gate and a failure pin of the AC power supply unit output power interruption detection module is electrically coupled to a second input of the first OR gate.

6. The power supply system of claim 5, wherein the second switching module comprises a second OR gate, wherein an output of the first OR gate is electrically coupled to a first input of the second OR gate and an output of the DC power supply unit microcontroller is electrically coupled to a second input of the second OR gate, wherein an output of the second OR gate is electrically coupled to an input of the DC power supply unit output control module.

7. The power supply system of claim 6, wherein the AC power supply unit input power interruption detection module and the AC power supply unit output power interruption detection module detect whether power interruption occurs to an input end and an output end of the AC power supply unit, respectively, wherein, if power interruption occurs to one of the input end and the output end of the AC power supply unit, the first OR gate will output an enabling signal for enabling the second OR gate, and an output of the second OR gate will enable the DC power supply unit output control module to control the DC power supply unit to supply power to the at least one computer unit.

8. The power supply system of claim 1, wherein the system administration module comprises an integration management module (IMM).

9. The power supply system of claim 5, wherein the AC power supply unit input power interruption detection module comprises a power factor correction controller.

10. The power supply system of claim 5, wherein the AC power supply unit output power interruption detection module comprises a pulse width modulation (PWM) controller.

11. The power supply system of claim 5, wherein the DC power supply unit output control module comprises a power factor correction controller.

12. A data center, comprising:

an information processing system electrically coupled to an AC power source and comprising at least one computer unit; and a power supply system comprising:

at least one AC power supply unit electrically coupled to the at least one computer unit and the AC power, respectively;

at least one DC power supply unit electrically coupled to the at least one computer unit; and a backup power unit electrically coupled to the at least one DC power supply unit, wherein, in response to the at least one AC power supply unit not supplying power, the at least one DC power supply unit automatically supplies power to the at least one computer unit; and wherein the at least one computer unit comprises a system administration module, the at least one AC power supply unit comprises an AC power supply unit microcontroller, and the DC power supply unit comprises a DC power supply unit microcontroller, wherein the system administration module is electrically coupled to the AC power supply unit microcontroller and the DC power supply unit microcontroller via a communication bus to thereby control one of the at least one AC power supply unit and the DC power supply unit to supply power to the at least one computer unit; and wherein the at least one AC power supply unit comprises a first switching module, wherein the at least one DC power supply unit comprises a second switching module and a DC power supply unit output control module, wherein an output of the first switching module is electrically coupled to an input of the second switching module, wherein an output of the second switching module is electrically coupled to an input of the DC power supply unit output control module, wherein, in response to the at least one AC power supply unit not supplying power, the first switching module sends an enabling signal for enabling the second switching module and thereby enabling the DC power supply unit output control module to control the at least one DC power supply unit to supply power to the at least one computer unit.

13. The data center of claim 12, wherein, in response to the at least one AC power supply unit supplying power well, the at least one DC power supply unit operates in a standby mode, such that components of the at least one DC power supply unit operate in a standby mode and with a wattage output of about zero.

14. The data center of claim 12, wherein, if power interruption does not occur to one of an input end and an output end of the AC power supply unit, a load output of the DC power supply unit will be about zero, wherein, if power interruption occurs to one of the input end and the output end of the AC power supply unit, the DC power supply unit will instantly provide a load output.

15. The data center of claim 12, wherein the backup power unit comprises an uninterruptible power supply (UPS) system or a battery.

16. The data center of claim 12, wherein the first switching module comprises a first OR gate, and the at least one AC power supply unit further comprises an AC power supply unit input power interruption detection module and an AC power supply unit output power interruption detection module, wherein a failure pin of the AC power supply unit input power interruption detection module is electrically coupled to a first input of the first OR gate and a failure pin of the AC power supply unit output power interruption detection module is electrically coupled to a second input of the first OR gate.

* * * * *